(12) United States Patent
Griffin

(10) Patent No.: US 8,743,066 B2
(45) Date of Patent: Jun. 3, 2014

(54) ELECTRONIC DEVICE WITH CAPACITIVE TOUCH-SENSITIVE DISPLAY

(75) Inventor: Jason Tyler Griffin, Waterloo (CA)

(73) Assignee: Blackberry Limited, Waterloo (CA)

( * ) Notice: Subject to any disclaimer, the term of this patent is extended or adjusted under 35 U.S.C. 154(b) by 213 days.

(21) Appl. No.: 13/316,171

(22) Filed: Dec. 9, 2011

(65) Prior Publication Data

US 2013/0147753 A1    Jun. 13, 2013

(51) Int. Cl.
*G06F 3/041* (2006.01)

(52) U.S. Cl.
USPC ....................................... 345/173

(58) Field of Classification Search
None
See application file for complete search history.

(56) References Cited

U.S. PATENT DOCUMENTS

| 7,747,007 | B2 | 6/2010 | Hyun et al. |
| 2009/0052654 | A1 | 2/2009 | Hyun et al. |
| 2009/0321149 | A1 | 12/2009 | Kaltner |
| 2010/0315348 | A1 | 12/2010 | Jellicoe et al. |
| 2011/0050619 | A1 | 3/2011 | Griffin |
| 2011/0248947 | A1 | 10/2011 | Krahenbuhl et al. |

FOREIGN PATENT DOCUMENTS

CA    2733236 A1    9/2011

OTHER PUBLICATIONS

Website: http://www.applegazette.com/hardware/ipad-2s-smart-covers-magic-made-from-magnets/ published Mar. 14, 2011.
International Search Report and Written Opinion of the International Searching Authority dated Jan. 17, 2013, issued in respect of corresponding International Patent Application No. PCT/CA2012/050792.
Extended European Search Report dated Jul. 25, 2012, issued against corresponding European Patent Application No. 11192825.5.

*Primary Examiner* — Jason Olson
(74) *Attorney, Agent, or Firm* — Geoffrey deKleine; Borden Ladner Gervais LLP

(57) ABSTRACT

A method includes detecting a cover on a touch-sensitive display of an electronic device, and automatically increasing sensitivity of the touch-sensitive display to a touch when the cover is detected, without user interaction.

15 Claims, 3 Drawing Sheets

ELECTRONIC DEVICE WITH CAPACITIVE TOUCH-SENSITIVE DISPLAY

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and may have limited space for user input and output. The information displayed on the display may be modified depending on the functions and operations being performed.

Improvements in electronic devices with displays are desirable.

DETAILED DESCRIPTION

Figure 1:
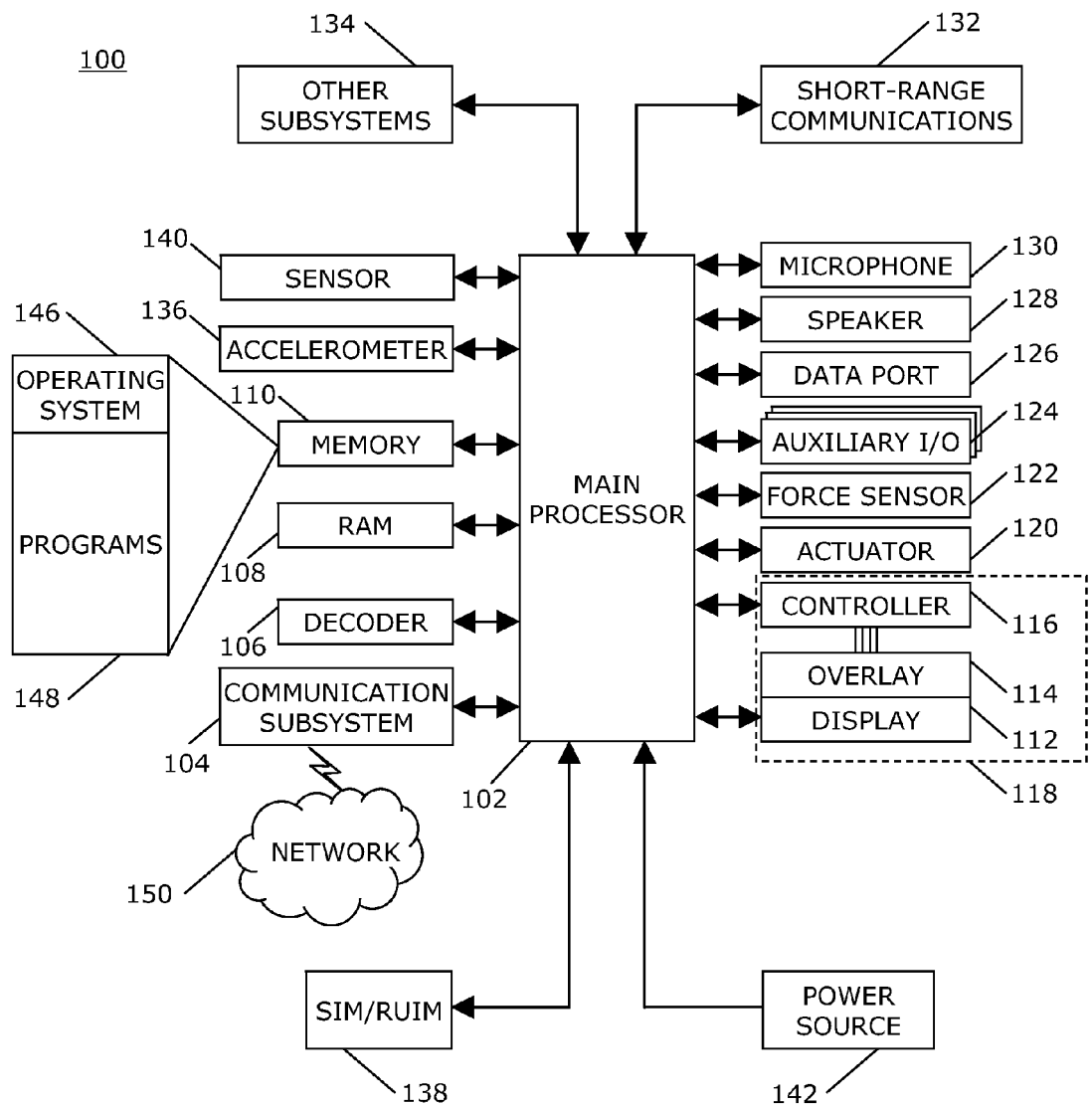
FIG. 1 is a block diagram of a portable electronic device in accordance with the disclosure.

The following describes an electronic device and a method that includes detecting a cover on a touch-sensitive display of an electronic device, and automatically increasing sensitivity of the touch-sensitive display to a touch when the cover is detected.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, which is a portable electronic device in the embodiments described herein. Examples of portable electronic devices include mobile, or handheld, wireless communication devices such as pagers, cellular phones, smartphones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, an auxiliary input/output (I/O) subsystem 124, a data port 126, a speaker 128, a microphone 130, short-range communications 132, and other device subsystems 134. Input via a graphical user interface is provided via the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

The processor 102 may also interact with a sensor or detector 140, which may be, for example, a Hall effect sensor, to detect a cover disposed on the touch-sensitive display 118. Alternatively, the sensor 140 may be, for example, a mechanical sensor or any other suitable sensor to detect the cover disposed on the touch-sensitive display 118.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be a capacitive touch-sensitive display. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and an overlay cover. The capacitive touch sensor layers may comprise any suitable material, such as indium tin oxide (ITO). The capacitive touch-sensor layers include electrodes, also known as touch-sensors.

One or more touches, also known as touch contacts or touch events, may be detected by the touch-sensitive display 118. The processor 102 may determine attributes of the touch, including a location of a touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable input member, such as a finger, thumb, appendage, or other objects, for example, a stylus, pen, or other pointer, depending on the nature of the touch-sensitive display 118. Multiple simultaneous touches may be detected.

The processor may optionally interact with one or more actuator(s) 120. The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

The processor may optionally interact with one or more force sensors 122. The force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities.

Figure 2:
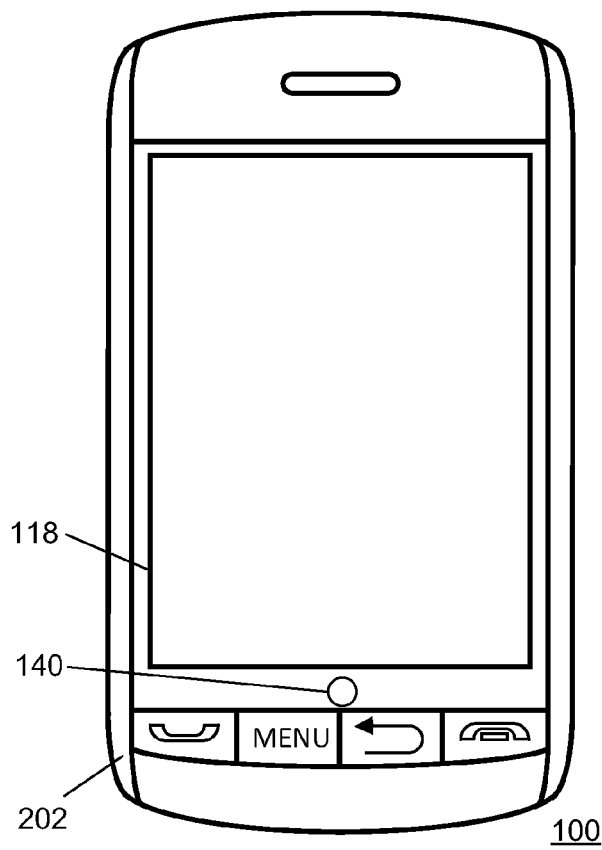
FIG. 2 is a front view of an example of an electronic device in accordance with the disclosure.

A front view of an example of the electronic device 100 is shown in FIG. 2. The electronic device 100 includes a housing 202 in which the touch-sensitive display 118 is disposed. The housing 202 and the touch-sensitive display 118 enclose components such as the components shown in FIG. 1. In the example of FIG. 2, the sensor 140 is disposed on the housing 202. Alternatively, the sensor 140 may be disposed in the housing 202.

Figure 3:
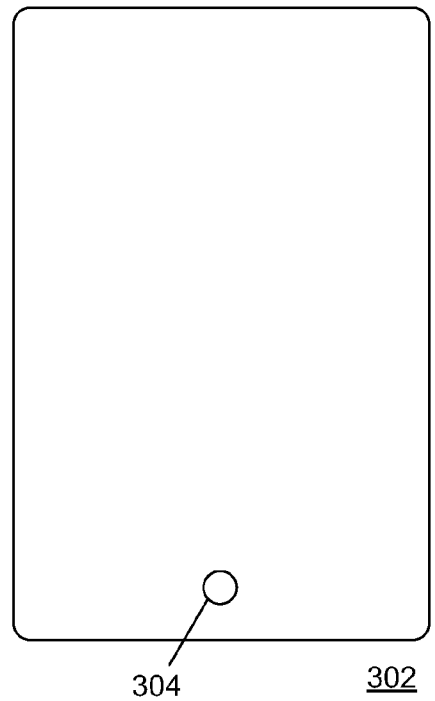
FIG. 3 is front view of an example cover for an electronic device in accordance with the disclosure.
Figure 4:
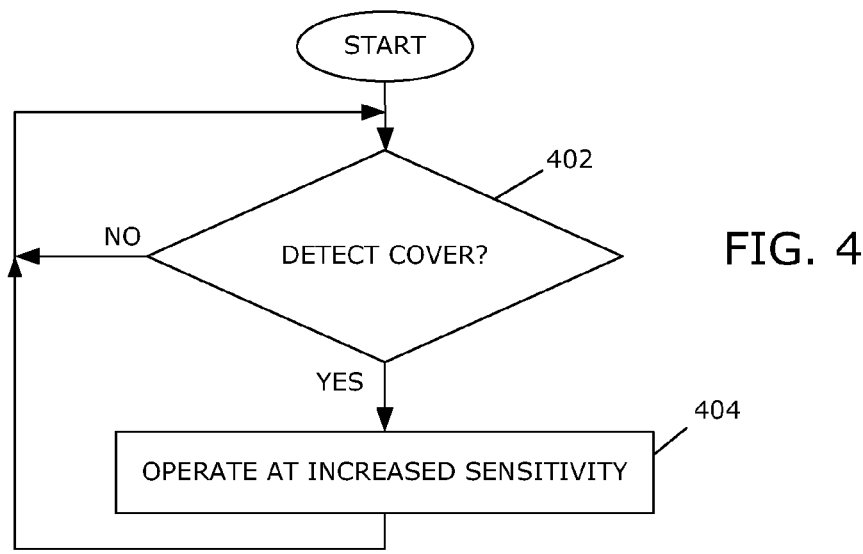
FIG. 4 is a flowchart illustrating a method of controlling the portable electronic device in accordance with the disclosure.

A front view of an example of a cover 302 is illustrated in FIG. 3. In the example of FIG. 3, the cover 302 is a sheet that is sized and shaped to overlie the touch-sensitive display 118. Optionally, one or more magnets 304 may be integrated into the cover 302 or otherwise attached to the cover 302. The magnet 304 may be located at any suitable position on the cover 302 without interfering with the information displayed on the touch-sensitive display 118. The magnet 304 may be attached to the cover 302 near one end, such that the magnet 304 is near the touch-sensitive display 118, on the housing 202 when the cover 302 is disposed on the electronic device 100. The magnet 304 facilitates detection of the cover 302 utilizing the sensor 140, which may be a Hall effect sensor, when the cover 302 is disposed on the touch-sensitive display 118. Optionally, a plurality of magnets may be integrated into or otherwise attached to the cover 302 to facilitate alignment and/or retaining of the cover 302 with the portable electronic device 100. One or more of the magnets may be aligned with one or more Hall effect sensors to facilitate sensing the cover 302. Alternatively, the cover 302 may be detected on the touch-sensitive display 118 utilizing, for example, a mechanical sensor, a proximity sensor, a switch, any other suitable sensor, or a detecting mechanism. When the cover 302 is disposed on the touch-sensitive display 118, the cover 302 is detected by any detector as described herein.

The cover 302 may be disposed on or removed from the touch-sensitive display 118. When disposed on the touch-sensitive display 118, the cover 302 may be aligned with and retained on the touch-sensitive display 118 in any suitable manner. For example, the cover 302 may be retained on the touch-sensitive display 118 by mechanical interlock such as a hinge or other coupling mechanism, by magnetic force utilizing magnets, or may be retained by adhering to the touch-sensitive display 118.

The cover 302 may be translucent, for example, an optically clear plastic, and is disposed on the touch-sensitive display 118 to protect the touch-sensitive display 118 from scratches, light impacts, dust, or dirt, for example. Alternatively, the cover 302 may be a glass cover. The cover 302 is advantageously removable from the portable electronic device 100.

A flowchart illustrating a method of controlling the touch-sensitive display 118 when a protective cover, such as the cover 302 or 502, is utilized. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium. The example is described with respect to the cover 302, although the method may be similarly applied to the cover 502.

The cover 302 may be placed on or over the touch-sensitive display 118 at any time. For example, the cover 302 may be placed on the touch-sensitive display 118 when the portable electronic device 100 is powered off, when operating at low or reduced power, for example, when the touch-sensitive display 118 is not engaged or active, or during normal (powered) operation of the portable electronic device 100. The cover 302 may be maintained on the touch-sensitive display 118 to protect the touch-sensitive display 118. When the cover 302 is detected 402, the sensitivity of the touch-sensitive display 118 is changed 404 such that the touch-sensitive display 118 operates at a greater sensitivity when the cover is detected than when the cover is not detected. For example, one capacitive touch sensor layer may include drive lines that are driven with a drive signal by the controller 116. A second layer may include sense lines that are utilized to measure signals caused by changes in electric field when a user touches the touch-sensitive display 118. The measured signals may be compared to a threshold value such that a touch is detected when a measured signal meets the threshold value. The sensitivity may be increased by decreasing the threshold value or by utilizing a lower threshold value. Optionally, the sensitivity may be increased by changing the drive signal to increase the drive voltage. For example, the sensitivity may be automatically increased by increasing the drive voltage applied across electrodes of the touch-sensitive display 118. The measured signal meets the threshold when the signal is equal to or exceeds the value. The increased sensitivity is maintained while the cover is detected, e.g., the increased sensitivity is discontinued when the cover is no longer detected.

The sensitivity is increased automatically and without user-interaction to facilitate detection of a touch on the cover 302 when the cover 302 covers the touch-sensitive display 118. User selection or menu navigation to select an option to increase sensitivity at the time the cover 302 is placed on the touch-sensitive display 118 is unnecessary. The increase in sensitivity occurs at the time the cover 302 is disposed on or over the touch-sensitive display 118 and a touch need not be detected to cause the increase. Delay time between touch contact with the cover 302 and detection of the touch is not unnecessarily increased.

Optionally, the sensitivity may be increased based on the measured signals from the sense lines when a cover 302 is detected. A touch on the cover 302 of the touch-sensitive display 118 causes a change in the electric field, resulting in a change in signals from the sense lines. This change in signals may be detected. When the cover 302 is detected, the threshold value utilized to detect a touch may be decreased based on the highest detected value of the signal when the change in signals is detected. Alternatively, the drive voltage may be increased based on the highest detected value of the signal when the change is detected. Changes in sensitivity may differ, for example, for covers of different thicknesses or different materials. This increased sensitivity, or increased drive voltage, is automatically engaged when a cover is detected and facilitates touch detection.

Figure 5:
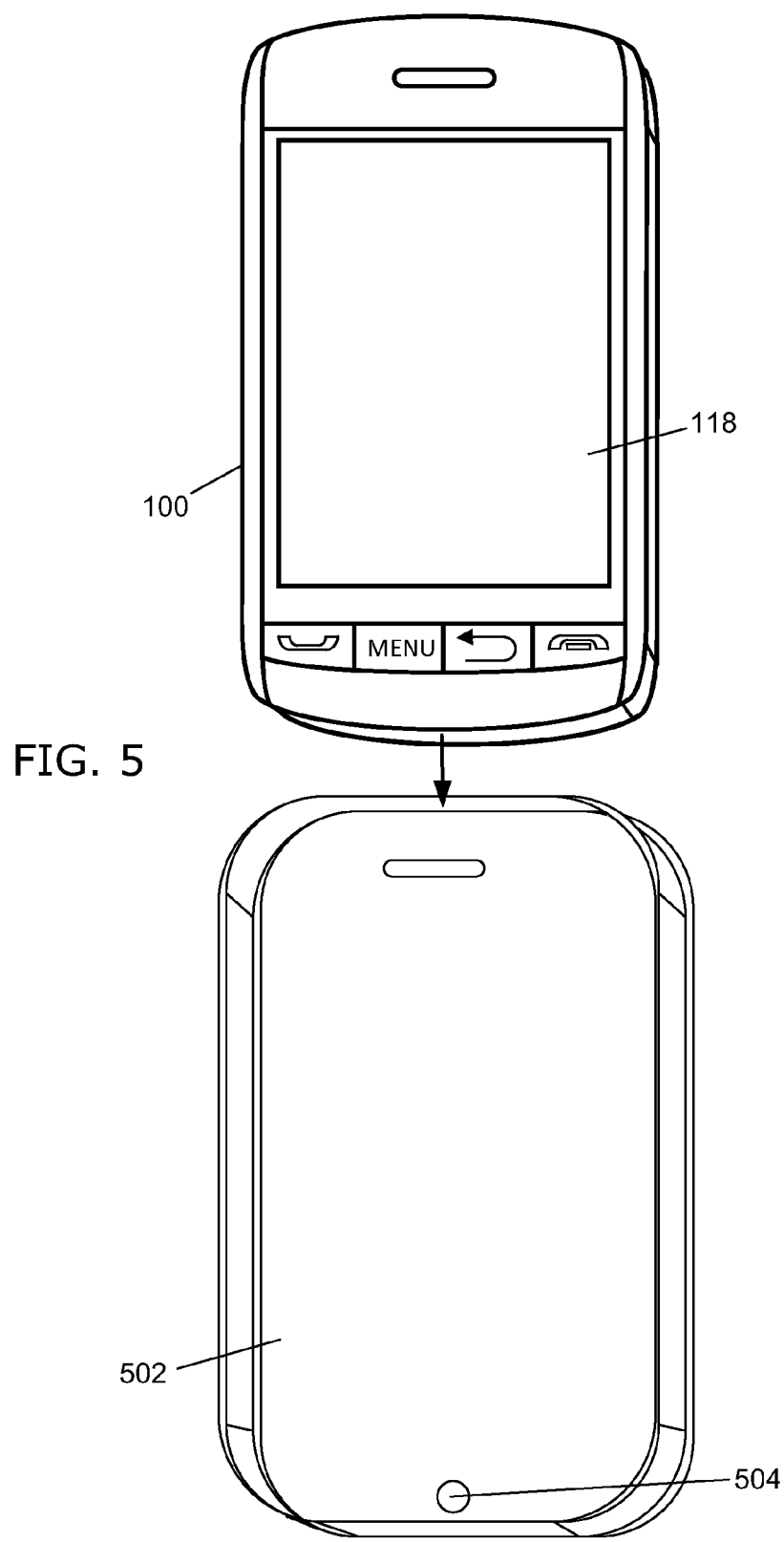
FIG. 5 is a perspective front view of another example of a cover for an electronic device in accordance with the disclosure.

A front view of another example of a cover 502 is illustrated in FIG. 5. In the example of FIG. 5, the cover 502 is a case or a sleeve that is sized and shaped to receive the portable electronic device 100. The cover 502 includes sides and at least a front face that is disposed on the touch-sensitive display 118 when the cover 502 is mated with the electronic device 100. The cover 502 may have a compression fit with the portable electronic device 100 to retain the cover 502 with the device 100. Optionally, a magnet 504 or magnets may be integrated into the cover 502 or otherwise attached to the cover 502 for detection and/or retention. The magnet(s) 504 may be located at any suitable position on the cover 502 without interfering with the information displayed on the touch-sensitive display 118. The magnet 504 may be aligned with the sensor 140, which may be a Hall effect sensor, to facilitate sensing the cover 502. Alternatively, the cover 502 may be detected on the portable electronic device 100 utilizing, for example, a mechanical sensor or any other suitable sensor, such as the examples described above. When the cover 502 is disposed on the portable electronic device 100, e.g., covering the touch-sensitive display 118, the cover 502 is detected.

The cover 502 may be any suitable material or combination of materials. For example, the cover may be a leather cover that includes an optically clear plastic front that covers the touch-sensitive display 118. The cover 502 may be utilized to protect the portable electronic device 100 and to protect the touch-sensitive display 118. Alternatively, the cover may have one or more openings or holes to facilitate access to buttons, keys such as may be part of a keyboard, navigation devices, speakers, microphones, or other devices.

By automatically increasing the sensitivity such that the portable electronic device 100 operates with greater touch sensitivity when the cover is detected, a touch may be detected through the cover, thus providing a similar touch response when touching the cover or when touching the touch-sensitive display directly without the cover. With the increased sensitivity, the cover does not adversely affect the detection of a touch. Despite the addition of the cover, such as a layer of plastic or glass, to the touch-sensitive display 118, a touch is detected without requiring a touch on the touch-sensitive display 118 to be applied with additional force, for example. Thus, the addition of the cover does not affect operation of the touch-sensitive display, and the electronic device automatically provides effectively the same touch response with or without the cover.

A method includes detecting a cover on a touch-sensitive display of an electronic device, and automatically increasing sensitivity of the touch-sensitive display to a touch when the cover is detected. An electronic device includes a capacitive touch-sensitive display, a sensor arranged and constructed to detect a cover on the touch-sensitive display, and a processor coupled to the sensor and the touch-sensitive display to automatically increase sensitivity of the touch-sensitive display to a touch when the cover is detected.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:
1. A method comprising:
   detecting a cover on a touch-sensitive display of an electronic device;
   automatically increasing sensitivity of the touch-sensitive display to a touch when the cover is detected.
2. The method according to claim 1, wherein automatically increasing comprises maintaining increased sensitivity while the cover covers the touch-sensitive display.
3. The method according to claim 1, wherein automatically increasing sensitivity comprises automatically decreasing a threshold value utilized to detect a touch based on a comparison to signals from touch sensors of the touch-sensitive display.

4. The method according to claim 1, wherein automatically increasing sensitivity comprises automatically increasing a drive voltage applied across electrodes of the touch-sensitive display.

5. The method according to claim 1, wherein detecting a cover comprises detecting a sheet sized to overlie the display.

6. The method according to claim 1, wherein detecting a cover comprises detecting a case around a housing of the electronic device.

7. The method according to claim 1, wherein detecting comprises utilizing at least one sensor of the electronic device to detect the cover.

8. The method according to claim 1, wherein detecting comprises utilizing at least one of a magnetic sensor, a Hall effect sensor, and a switch to detect the cover.

9. A computer-readable storage device having computer-readable code executable by at least one processor of the electronic device to perform the method of claim 1.

10. An electronic device comprising:
a capacitive touch-sensitive display;
a sensor arranged and constructed to detect a cover on the touch-sensitive display;
a processor coupled to the sensor and the touch-sensitive display to automatically increase sensitivity of the touch-sensitive display to a touch when the cover is detected.

11. The electronic device according to claim 10, wherein increased sensitivity of the touch-sensitive display is maintained while the cover covers the touch-sensitive display.

12. The electronic device according to claim 10, wherein the sensitivity is increased by decreasing a threshold value utilized to detect a touch based on a comparison to signals from touch sensors of the touch-sensitive display.

13. The electronic device according to claim 10, wherein the sensitivity is increased by automatically increasing a drive voltage applied across electrodes of the touch-sensitive display.

14. The electronic device according to claim 10, wherein the sensor is disposed on a housing of the electronic device.

15. The electronic device according to claim 10, wherein the sensor comprises at least one of a magnetic sensor, a Hall effect sensor, and a switch.

* * * * *